US006852955B1

(12) United States Patent
Golan et al.

(10) Patent No.: US 6,852,955 B1
(45) Date of Patent: Feb. 8, 2005

(54) ADHESIVE COMPOSITION FOR ELECTRICAL PTC HEATING DEVICE

(75) Inventors: Gad Golan, Hod Hasharon (IL); Yuly Galperin, Holon (IL)

(73) Assignee: A.T.C.T. Advanced Thermal Chips Technologies Ltd., Tel Aviv (IL)

( * ) Notice: Subject to any disclaimer, the term of this patent is extended or adjusted under 35 U.S.C. 154(b) by 0 days.

(21) Appl. No.: 09/463,726

(22) PCT Filed: Jul. 30, 1998

(86) PCT No.: PCT/IL98/00354

§ 371 (c)(1),
(2), (4) Date: May 4, 2000

(87) PCT Pub. No.: WO99/06496

PCT Pub. Date: Feb. 11, 1999

(Under 37 CFR 1.47)

(30) Foreign Application Priority Data

Aug. 1, 1997 (IL) ................................................ 121449

(51) Int. Cl.$^7$ ................................................ H05B 1/02
(52) U.S. Cl. .................... 219/505; 219/504; 219/536; 428/317.7; 428/355 R
(58) Field of Search .................... 219/505, 504, 219/494, 520, 536, 530, 541; 428/317.1, 317.7, 355 R, 317.9

(56) References Cited

U.S. PATENT DOCUMENTS

| | | | |
|---|---|---|---|
| 4,352,008 A | 9/1982 | Hofer et al. | |
| 4,414,052 A | 11/1983 | Habata et al. | |
| 5,562,844 A | 10/1996 | Bohlender et al. | |
| 5,608,267 A | * 3/1997 | Mahulikar et al. | .......... 257/796 |
| 5,756,215 A | 5/1998 | Sawamura et al. | |
| 6,005,182 A | * 12/1999 | Imanishi et al. | ............ 136/201 |
| 6,496,373 B1 | * 12/2002 | Chung | ........................ 361/705 |

* cited by examiner

*Primary Examiner*—Mark Paschall
(74) *Attorney, Agent, or Firm*—G.E.Ehrlich (1995) Ltd.

(57) ABSTRACT

The invention relates to an electrically and thermally conductive adhesive composition for cementing together at least one metallized (e.g. aluminized or silvered) surface of a positive temperature coefficient (PTC) element to at least one metallic (e.g. aluminum) electrode, in the manufacture of PTC thermistor devices which are potentially capable of operating in a working temperature range not less than −55° C. to +300° C. and for at least 30,000 hours. The composition comprises, as the adhesive component, a curable silicone (e.g. silicone rubber) prepolymer, as well as finely divided silicon carbide and finely-divided silicon, and preferably also a finely-divided metallic powder.

17 Claims, 1 Drawing Sheet

ADHESIVE COMPOSITION FOR ELECTRICAL PTC HEATING DEVICE

FIELD OF THE INVENTION

The present invention relates to an electrically and thermally conductive adhesive composition for use in the manufacture of positive temperature coefficient (PTC) thermistor devices, to such method of manufacture and to the devices thereby obtained.

BACKGROUND OF THE INVENTION

Positive temperature coefficient (PTC) thermistor devices, comprising electrode/PTC element/electrode assemblies are well-known. The assemblies may be held together mechanically or by adhesion. The adhesion method has potentially the advantages of simplicity of design, ready transfer of heat at the contact areas, technological effectiveness, reliability, durability and economy. Examples of the relevant prior art are as follows:

U.S. Pat. Nos. 4,177,376, 4,330,703 and 4,543,474 describe a self-regulating heating article comprising a PTC layer and at least one layer of constant wattage output material at least partially contiguous therewith and preferably bound thereto by adhesive, which is activated and changes dimensions when the article is heated.

U.S. Pat. No. 4,419,564 describes use of an electrically and thermally conductive adhesive for bonding PTC elements to metallic elements in a self-regulating electric heater for use in an early fuel evaporation system for automotive engines.

U.S. Pat. No. 4,689,878 describes heat-generating resistance devices, for use in a crankcase heater, such devices including a PTC heater element adhesively bonded between a pair of metallic electrodes by means of an adhesive which is both thermally and electrically conductive.

In U.S. Pat. No. 4,899,032, there are described PTC ceramic resistors which are electrically coupled and mechanically fixed to metallic bodies (serving as current supply conduits) by an adhesive, and serve to heat a flowing medium in a heat exchanger.

U.S. Pat. No. 4,937,551 describes a PTC device wherein the PTC material is protected from degradation by mechanical (e.g. shear) forces by one or more adhesive masses in contact with both terminals of the device.

In U.S. Pat. No. 4,977,309, there is described an organic PTC device which includes an organic PTC thermistor sheet, on one main surface of which a pair of electrodes is formed and conductive adhesives are used to adhere a conductive sheet at each electrode, the assembly being covered by insulating film.

U.S. Pat. No. 5,239,163 describes an automobile air heater utilizing PTC tablets adhesively fixed to tubular heat sinks by means of a flexible electrically conductive adhesive.

U.S. Pat. No. 5,354,969 describes a PTC thermistor heater in which an electrode paste material containing conductive particles is printed and then baked on the surface of a PTC element to form a first electrode having a rough surface, which is brought into contact with a second electrode of heat radiating means by the conductive particles.

In U.S. Pat. No. 5,358,793, there is described a device having a PTC material bound on opposed sides thereof to conductive foils by a conductive adhesive having a thermal coefficient of expansion intermediate between that of the foil and that of the PTC material.

U.S. Pat. No. 5,499,087 describes a heat fixing device (for electrophotography) including a heating head formed by attaching a radiant plate to the radiant surface of a PTC element by use of a thermally conductive adhesive.

The entire contents of all of the above-stated U.S. Patents are deemed incorporated by reference herein.

In order to achieve the potential advantages mentioned above, however, it is desirable for the PTC thermistor devices to meet the following requirements:
1. Working temperature range is not less than about −55° C. to +300° C.
2. High thermal conductivity.
3. High thermal conductivity at the electrode/PTC element contact areas.
4. High dielectric strength and volume resistivity beyond the contact areas.
5. High resistance to repeated mechanical and thermal impacts in the range −55° C. to +300° C.
6. After hardening, adhesive resilience is maintained at the contact areas in order to compensate for mechanical tension at high temperatures.
7. Lack of corrosive attack on the cemented PTC thermistor devices.
8. The above-mentioned qualities 1–7 should be maintained for no less than 30,000 hours.

Known adhesives exhibit some but not all of these desired characteristics. For example, the high-temperature adhesive Ceramobond™ 5526, AREMCO PRODUCTS INC. Catalog M12 5/95, Bulletin No, M2, complies with the requirements as to working temperature range, dielectric properties and resistance to mechanical/thermal stresses (1, 4, 5), but does not comply with the other parameters (2, 3, 6, 8). Other adhesives, for example, AREMKO-BOND™ EPOXY 805. AREMCO PRODUCTS INC. Catalog V12 5/95, Bulletin No, M6, or AREMCO-SHIELD™ 615, AREMCO PRODUCTS INC. Catalog M12 5,95, Bulletin No. M17, comply with the above requirements as to working temperature range, heat conductivity and electrical conductivity/dielectric properties (1, 2, 4, 7), but not with the other parameters (3, 5, 6, 8). Some silicone adhesives, for example, DOW CORNING™ 3145 Silicone Adhesive-Gray, DOW CORNING CORPORATION, comply with the requirements as to working temperature range, dielectric properties, and resilience after hardening (1, 4, 5, 6, 7) but not with the other parameters (2, 3, 8). It is clear that none of the known adhesives combine all of the above-stated requirements, and in particular that none of them combine properties 3 and 8 with the other parameters, i.e. especially they do not provide high efficiency, reliability and durability in full measure.

A principal object of the present invention is to make possible the provision of an electrically and thermally conductive adhesive composition for cementing together PTC elements having metallized surfaces to metallic electrode elements, which combines all of the desired characteristics.

Another object of the invention is make possible the provision of such an adhesive which decreases resistance to thermal transfer and thereby increases the heat output of the resulting PTC thermistor devices.

Other objects of the invention will appear from the ensuing description.

SUMMARY OF THE INVENTION

In one aspect, the present invention provides, in an electrically and thermally conductive adhesive composition for cementing together at least one metallized surface of a positive temperature coefficient (PTC) element to at least one metallic electrode, in the manufacture of PTC thermistor devices, and in which the adhesive component is essentially a curable silicone prepolymer, the improvement which comprises including in the composition finely divided silicon carbide with finely-divided silicon, either separately or in admixture.

In another aspect, the present invention provides, in a method for manufacturing a positive temperature coefficient (PTC) thermistor device which includes at least one step of cementing together at least one metallized surface of a PTC element to at least one metallic electrode, by means of an electrically and thermally conductive adhesive composition in which the adhesive component is essentially a curable silicone prepolymer the improvement which comprises including in the composition finely divided silicon carbide with finely-divided silicon, either separately or in admixture.

In still another aspect, the present invention provides a PTC thermistor device which has been manufactured according to the method of the invention. By utilizing the method of manufacture of the invention, there can be obtained PTC thermistor devices having the above-described desirable properties, and in particular, PTC thermistor devices which are serviceable in a working temperature range not less than −55° C. to +300° C., and have a life of at least 30,000 hours.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figures 1A, 1B, 1C:
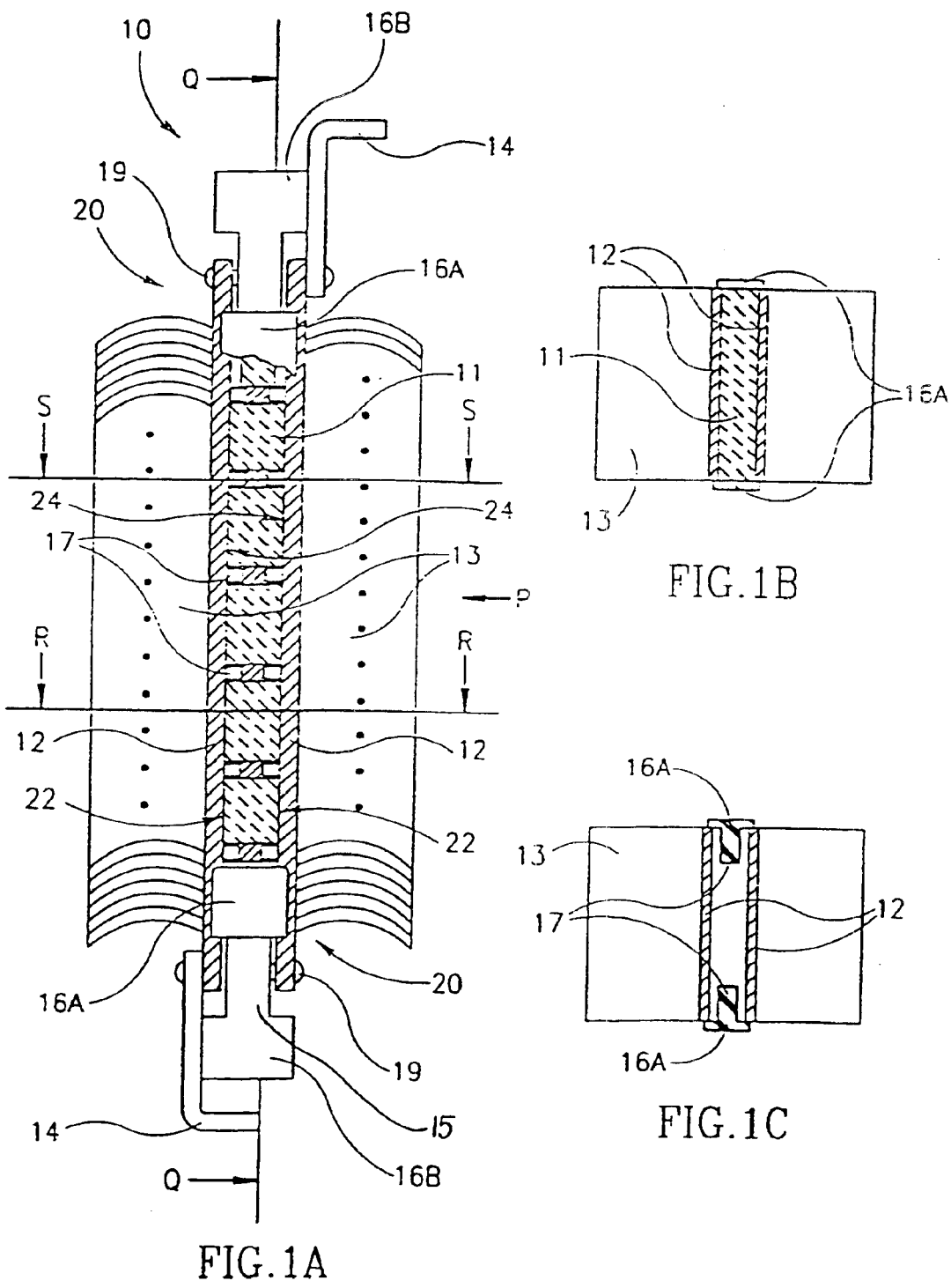
FIG. 1A is a schematic side-sectional view of an electrical heating device constructed by using an adhesive according to a particular embodiment of the present invention.
FIGS. 1B and 1C are cross-sectional views of the electrical heating device of FIG. 1A, taken along lines R—R and S—S therein, respectively.

In the electrically and thermally conductive adhesive composition according to the invention, the adhesive component may be in general any curable silicone prepolymer, known in the art for adhesive uses, and which may be cured in known manner by use of heat, moisture, catalyst, or other curing means, or any combination of the same (the preferred manner of cure will generally depend on the nature of the silicone prepolymer, in any particular case). The curable silicone prepolymer may be for example a curable silicone rubber prepolymer, that is to say, it is a prepolymer which may be cured in a conventional manner, affording a silicone rubber-like product Examples of such prepolymers useful in the present invention, are those known under the codes KL-4 and KLT-30, which are manufactured by Synthetic Resin Plant,1 Lebedev Street, 420054 Kazan, Russia; they are non-toxic, non-flammable and non-explosive, and otherwise have no adverse effects on humans; they are pastes, which are colorless and white, respectively. Both of these prepolymer adhesive components are used for sealing instruments to protect them from atmospheric humidity and/or to protect them where they are subject to vibration, as well as for cementing glass (including organic glass), ceramics and other silicate-based materials, while KLT-30 is also used for sealing threaded connections, particularly in domestic plumbing systems.

The adhesive composition of the invention is preferably characterized by at least one of the following features, namely:

(a) the metallized surface is selected from aluminized and silvered surfaces;
(b) the at least one metallic electrode is at least one aluminum electrode;
(c) the composition further includes a finely-divided metallic powder;
(d) the silicon carbide and (elemental) silicon are constituted by a mixture which is a by-product of a step in the manufacture of silicon semiconductors, which comprises polishing with silicon carbide, silicon plates or silicon wafers.

Moreover, the inventive composition is preferably additionally characterized by at least one of the following features, namely:

(i) the finely-divided metallic powder has a particle size no greater than about 40 $\mu$m;
(ii) said finely divided silicon carbide and finely divided silicon have particle sizes no greater than about 14 $\mu$m;
(iii) said finely divided silicon carbide and finely-divided silicon are present in a respective weight ratio of about 0.9 to 1.1: about 1.0;
(iv) the respective weight ratios of said finely-divided metallic powder, said finely divided silicon carbide taken together with finely divided silicon, and said curable silicone prepolymer, are 0.1 (±5%):1.1 (±5%):1 (±5%), and preferably 0.1 (±1%):1.1 (±1%):1 (±1%).

It is also a particularly preferred feature of the adhesive composition of the invention, that the curable silicone prepolymer has a viscosity at ambient temperature within the range of 15,000 to 25,000 $\mu$Pa/sec.

DETAILED DESCRIPTION OF THE DRAWINGS

Referring now to FIG. 1A, there is shown, as an illustration of the utility of the adhesive composition of the invention, an electrical heating device referred to generally as 10, which includes an array of one or more positive temperature coefficient (PTC) thermistor heating elements 11. Elements 11 are fabricated with preferably parallel, generally flat, surfaces on opposing faces 22, which are coated with a conductive metal such as aluminum, to serve as thermal and electrical contact surfaces. On opposing sides of elements 11 there are located heat radiator units 20, each of which includes a plate 12 and separate series of curved heat exchange fins 13 extending generally transversely from each plate 12, respectively. Radiator units 20 are made of material that is a good thermal and electrical conductor, such as aluminum. The plates 12 of the radiator units 20 are fabricated with flat inward-facing surfaces 24 to serve as thermal and electrical contact surfaces. Pins 19 are provided in order to position plates 12 by engaging holes (not shown). Plates 12 may be fastened to pins 19 and a positioning frame (see below) by any suitable means, such as alloy welding or threaded screws or nuts. Plates 12 are moreover positioned so that the inward-facing contact surfaces are generally parallel to and in touching contact with the outward-facing contact surfaces 22 of the heating elements 11, via intervening respective layers of cured adhesive composition according to the present invention. These cured adhesive layers are intermediate each pair of surfaces 12, 22 and are not specifically indicated in the Figures. Attached to the plates 12 are terminals 14 which allow the heating device 10 to be connected to an electrical circuit. Direct application of electrical current to the thermistor heating elements 11 via the terminals 14 and the plates 12 serves, inter alia, to minimize the number of components in the present invention, thereby simplifying its design. (it will be appreciated that each radiator element, through which electricity is conducted to and via PTC elements 11, may be regarded as an electrode; in other forms of nomenclature terminals 14 are termed "electrodes".)

The PTC thermistor heating elements 11 convert electrical energy, applied thereto, to thermal energy. The thermal energy is, in turn, conducted from the heating elements 11 to the heat exchange fins 13 via the thermal interfaces and the plates 12. Air or other gas flow over fins 13 removes the heat from the device. As will be appreciated by persons skilled in the art, the contact between the heating elements 11 and the radiator units 20 via the highly heat- and electrically conductive cured adhesive of the invention has the advantage of allowing the heat to be transferred with great efficiency. This further simplifies the design of the device.

Enclosure of the array of heating elements 11 and the space containing it is shown in FIGS. 1B and 1C. FIG. 1B is a side-sectional view of the electrical heating device of FIG. 1A, taken along line R—R therein, which cuts the device through one of the thermistor heating elements 11. FIG. 1C is a cross-sectional view of the electrical heating device of FIG. 1A, taken along line S—S therein, which cuts the device through a pair of spacers 17. It may be noted that the array of heating elements 11 is completely enclosed by radiator unit plates 12 and an electrically insulating frame 15, the latter including longitudinal flanges 16A and endpieces 16B, so that heating elements 11 are prevented from being exposed to any cooling air or gas flow, so as to protect them from the known "pinch effect." For further details of the illustrated apparatus, reference may be made to our copending application no. (97102), the entire disclosure of which is deemed incorporated by reference herein.

The invention will be illustrated by the following non-limiting Example.

EXAMPLE

Materials (a) KL-4 (Russian technical specification TU 38.103691-89) is a silicone prepolymer which self-cures on exposure to atmospheric moisture and/or heat. It is normally stored in aluminum tubes, in which there is a tendency for it to separate into layers, which does not affect its utility; if, therefore, on squeezing 10 to 15 g from the tube, it is found that separation into layers has occurred, the contents are thoroughly mixed before proceeding further. KL-4, when cured, is serviceable in the temperature range −60° C. to +300° C., has an electrical strength of 15–25 kV/mm and a volume resistivity of $4.5–5.5 \times 10^{14}$ ohm-cm. A silicone prepolymer known by the code KLT-30 is also suitable for the present purpose.

(b) 64SM14T (Russian technical specification TU 2-036-1005-87) extra-fine polishing powder of particle size 10–14 $\mu$m, an approximately 1:1 by weight silicon carbide/silicon green admixture, in the form of a 50% suspension in distilled water, is obtained as a by-product from a step of polishing silicon wafers with silicon carbide, in the manufacture of semiconductors. The suspension is allowed to settle in a settling tank and the water is drained off. The silicon carbide/silicon admixture is heated at 120–130° C. for 2–3 hours. After cooling, the polishing powder is screened through a brass sieve, mesh no. 004.

(c) Aluminum powder may be for example that known in Russia by the trade designation PAP-1, Russian government standard GOST 5494-71, particle size 30–40 $\mu$m.

Preparation of the Adhesive Composition

Aluminum powder (10 pbw), KL-4 (100 pbw) and 64SM14T (110 pbw) are thoroughly mixed, preferably in a dry, inert atmosphere in a metallic, ceramic or inert polymeric vessel; depending on the efficiency of the blending operation, this need take no longer than 5–10 minutes, but it should be verified that the product is homogeneous, and contains no unmixed pockets of aluminum. It is preferable to use the composition immediately, or in any event within eight hours.

Use of the Adhesive Composition (a) The metallic electrodes, which are to be cemented to commercially available aluminized (or in the alternative, silvered) PTC elements, are constituted by the inner planar surfaces of aluminum radiator elements, which are finned at the outer surface for more effective distribution of generated heat, as described above with reference to the Figures. These inner surfaces are polished e.g. with a fine emery cloth, the residual duct from the polishing operation is removed, the surfaces are degreased with alcohol, and dried in air for 5–10 minutes. The homogeneous adhesive composition is applied evenly over the prepared surfaces, which are then pressed together with an intervening metallized e.g. aluminized PTC thermistor element (e.g. code B59102-R290-A10 of Siemens Matsushita Components) in a frame or clamp. Any excess adhesive is removed from the edges of the electrode/metallized PTC element/electrode assembly.

(b) The assembly is submitted to a pre-curing step of at least 16 hours at ambient temperature in the range 15–35° C., while the pressure is maintained, or increased, if necessary. Where a frame is used, this may become integral with the assembly.

(c) The assembly is then submitted to a curing step in a controlled-heat oven, wherein the temperature is raised by 40° C. until it reaches 170±2° C., the temperature then being maintained at 170±2° C. for a further four hours.

(Safety note: the usual precautions should be observed where handling flammable liquids or vapors, aluminum powder, and acetic acid vapors which are evolved from the KL-4 component during the pre-curing and/or curing reactions.)

The product of this Example complies with the above-stated requirements 1–7. Tests on 150 such products over a 10,000 hour period (without failure) demonstrate, as is known to practitioners in the art, that they have a 99% probability of a life expectancy exceeding 30,000 hours.

While particular embodiments of the invention have been particularly described hereinabove, it will be appreciated that the present invention is not limited thereto, since as will be readily apparent to skilled persons, many modifications or variations can be made. Such modifications or variations which have not been detailed herein are deemed to be obvious equivalents of the present invention.

What is claimed is:

1. In an electrically and thermally conductive adhesive composition for cementing together at least one metallized surface of a positive temperature coefficient (PTC) element to at least one metallic electrode, in the manufacture of PTC thermistor devices, and in which the adhesive component is essentially a curable silicone prepolymer, the improvement which comprises including in the composition finely divided silicon carbide and finely-divided silicon.

2. An electrically and thermally conductive adhesive composition according to claim 1, wherein said curable silicone prepolymer is a curable silicone rubber prepolymer, and said composition is additionally characterized by at least one of the following features, namely:

(a) said metallized surface is selected from the group of aluminized and silvered surfaces;
  (b) said at least one metallic electrode is at least one aluminum electrode;
  (c) said composition further includes a finely-divided metallic powder;

(d) said finely divided silicon carbide and finely-divided silicon are constituted by a mixture which is a by-product of a step in the manufacture of silicon semiconductors, which comprises polishing with silicon carbide, silicon plates or silicon wafers.

3. An electrically and thermally conductive adhesive composition according to claim 1, wherein said curable silicone prepolymer is a curable silicone rubber prepolymer, and said composition is additionally characterized by at least one of the following features, namely:
  (a) said metallized surface is selected from the group of aluminized and silvered surfaces;
  (b) said at least one metallic electrode is at least one aluminum electrode;
  (c) said composition further includes a finely-divided metallic powder selected from the group consisting of aluminum and silver powder;
  (d) said finely divided silicon carbide and finely-divided silicon are constituted by a mixture which is a by-product of a step in the manufacture of silicon semiconductors, which comprises polishing with silicon carbide, silicon plates or silicon wafers.

4. An electrically and thermally conduct adhesive composition according to either claim 2 or claim 3, wherein said curable silicone prepolymer is a curable silicone rubber prepolymer, and said composition is additionally characterized by at least one of the following features, namely:
  (i) said finely-divided metallic powder has a particle size no greater than about 40 $\mu$m;
  (ii) said finely divided silicon carbide and finely divided silicon have particle sizes no greater than about 14 $\mu$m;
  (iii) said finely divided silicon carbide and finely-divided silicon are present in a respective weight ratio of about 0.9 to 1.1: about 1.0;
  (iv) the respective weight ratios of said finely-divided metallic powder, said finely divided silicon carbide taken together with finely divided silicon, and said curable silicone prepolymer, are 0.1 ($\pm$5%):1.1 ($\pm$5%):1 ($\pm$5%).

5. An electrically and thermally conductive composition according to claim 1, wherein said curable silicone prepolymer has a viscosity at ambient temperature within the range of 15,000 to 25,000 $\mu$Pa/sec.

6. An electrically and thermally conductive composition according to claim 4, wherein said curable silicone prepolymer has a viscosity at ambient temperature within the range of 15,000 to 25,000 $\mu$Pa/sec.

7. In a method for manufacturing a positive temperature coefficient (PTC) thermistor device which includes at least one step of cementing together at least one metallized surface of a PTC element to at least one metallic electrode, by means of an electrically and thermally conductive adhesive composition in which the adhesive component is essentially a curable silicone prepolymer, the improvement which comprises including in the composition finely divided silicon carbide and finely-divided silicon.

8. A method according to claim 7, wherein said curable silicone prepolymer is a curable silicone rubber prepolymer, and said composition is additionally characterized by at east one of the following features, namely:
  (a) said metallized surface is selected from the group of aluminized and silvered surfaces;
  (b) said at least one metallic electrode is at least one aluminum electrode;
  (c) said composition further includes a finely-divided metallic powder;

(d) said finely divided silicon carbide and finely-divided silicon are constituted by a mixture which is a byproduct of a step in the manufacture of silicon semiconductors, which comprises polish with silicon carbide, silicon plates or silicon wafer.

9. A method according to claim 7, wherein said curable silicone prepolymer is a curable silicone rubber prepolymer, and said composition is additionally characterized by at least one of the following features, namely:
  (a) said metallized surface is selected from the group of aluminized and silvered surfaces;
  (b) said at least one metallic electrode is at least one aluminum electrode;
  (c) said composition further includes a finely-divided metallic powder selected from the group consisting of aluminum and silver powder;
  (d) said finely divided silicon carbide and finely-divided silicon are constituted by a mixture which is a by-product of a step in the manufacture of silicon semiconductors, which comprises polishing with silicon carbide, silicon plates or silicon wafers.

10. A method according to either claim 8 or claim 9, wherein said curable silicone prepolymer is a curable silicone rube prepolymer, and said composition is additionally characterized by at least one of the following features, namely:
  (i) said finely-divided metallic powder has a particle size no greater than about 40 $\mu$m;
  (ii) said finely divided silicon carbide and finely divided silicon have particle sizes no greater than about 14 $\mu$m;
  (iii) said finely divided silicon carbide and finely-divided silicon are present in a respective weight ratio of about 0.9 to 1.1: about 1.0;
  (iv) the respective weight ratios of said finely-divided metallic powder, said finely divided silicon carbide taken together with finely divided silicon, and said curable silicone prepolymer, are 0.1 ($\pm$5%):1.1 ($\pm$5%):1 ($\pm$5%).

11. A method according to claim 7, wherein said curable silicone prepolymer has a viscosity at ambient temperature within the range of 15,000 to 25,000 $\mu$Pa/sec.

12. A method according to either claim 8 or claim 9, wherein said curable silicone prepolymer is a curable silicone rubber prepolymer having a viscosity at ambient temperature within the range of 15,000 to 25,000 $\mu$Pa/sec, and said composition is additionally characterized by at least one of the following features, namely:
  (i) said finely-divided metallic powder has a particle size no greater than about 40 $\mu$m;
  (ii) said finely divided silicon carbide and finely divided silicon have particle sizes no greater than about 14 $\mu$m;
  (iii) said finely divided silicon carbide and finely-divided silicon are present in a respective weight ratio of about 0.9 to 1.1:about 1.0;
  (iv) the respective weight ratios of said finely-divided metallic powder, said finely divided silicon carbide taken together with finely divided silicon, and said curable silicone prepolymer, are 0.1 ($\pm$5%):1.1 ($\pm$5%):1 ($\pm$5%).

13. A PTC thermistor device which has been manufactured according to the method of any one of claims 7, 8, 9 or 11.

14. A PTC thermistor device which has been manufactured according to the method of claim 10.

15. A PTC thermistor device which has been manufactured according to the method of claim 12.

16. A PTC thermistor device which has been manufactured according to the method of claim 7, is serviceable in a working temperature range not less than −55° C. to +300° C. and has a life of at least 30,000 hours.

17. In an electrically and thermally conductive adhesive composition in which the adhesive component is essentially a curable silicone prepolymer, the improvement which comprises including in the composition finely divided silicon carbide with finely-divided silicon, either separately or in admixture, and a finely divided metallic powder.

* * * * *